United States Patent [19]

Bestland

[11] Patent Number: 4,897,072

[45] Date of Patent: Jan. 30, 1990

[54] APPARATUS FOR ADJUSTING THE SIEVE OF A COMBINE HARVESTER

[76] Inventor: Harlan Bestland, Box 99, Brunkild, Manitoba, Canada, R0G 0E0

[21] Appl. No.: 208,220

[22] Filed: Jun. 17, 1988

[51] Int. Cl.$^4$ .................. A01F 12/44; A01F 17/00
[52] U.S. Cl. ..................................... 460/99; 209/394; 460/100; 460/101
[58] Field of Search ............ 130/27 Z, 24, 25, 27 AE, 130/DIG. 1; 209/394; 460/99, 100, 101, 902

[56] References Cited

U.S. PATENT DOCUMENTS

| | | |
|---|---|---|
| 811,025 | 1/1906 | Baker . |
| 812,340 | 2/1906 | Hardgrove . |
| 1,083,993 | 1/1914 | Crippen . |
| 1,158,944 | 11/1915 | Lucas . |
| 1,689,314 | 10/1928 | Worthington . |
| 1,852,361 | 4/1932 | Naffziger . |
| 2,554,416 | 5/1951 | Morissey ............... 209/394 |
| 2,642,993 | 6/1953 | Straley ............... 130/24 X |
| 3,021,009 | 2/1962 | Scott ............... 209/394 |
| 3,334,744 | 8/1967 | James et al. ............... 209/394 |
| 3,472,378 | 10/1969 | Payne ............... 209/394 |
| 4,502,493 | 3/1985 | Jones et al. ............... 130/24 |
| 4,598,718 | 7/1986 | Glaubitz et al. ............... 130/27 AE |
| 4,712,568 | 12/1987 | Strong et al. ............... 209/394 X |

Primary Examiner—Stephen J. Novosad
Attorney, Agent, or Firm—Adrian D. Battison; Stanley G. Ade; Murray E. Thrift

[57] ABSTRACT

A combination harvester of conventional type includes a reciprocating sieve onto which the grain and chaff is deposited for separation by differential response to air flow passing through openings in the sieve. The openings in the sieve can be adjusted by an adjustment mechanism in the form of levers positioned at the rear of the sieve. A kit of parts is provided to communicate rotation of the hand crank within the cab of the combine through a flexible pipe which passes through an opening in the combine wall to a screw and nut arrangement which acts to adjust the levers of the sieve adjustment mechanism in dependence upon rotation of the hand crank. The reciprocation of the sieve relative to the combine wall is taken up by flexing of the pipe. The ability to adjust the sieve from within the cab allows on the go adjustment for fine tuning of the separation by the sieve according to harvesting conditions.

14 Claims, 2 Drawing Sheets

APPARATUS FOR ADJUSTING THE SIEVE OF A COMBINE HARVESTER

BACKGROUND OF THE INVENTION

This invention relates to an apparatus for adjusting the sieve of a combine harvester which can be provided either as a device attached to an existing combine harvester or can be provided as a kit of parts for attachment to a combine harvester to provide the necessary adjustment.

As is well known, a combine harvester generally comprises a frame mounted on ground wheels for movement across the ground in a working direction, a cab in which the operator will sit for steering and controlling the combine, a header for picking up the crop to be harvested either in the form of a swath or directly cutting a standing crop, a straw separation arrangement generally in the form of a cylinder and straw walkers which separate grain and chaff from the straw of the crop, and a sieve onto which the separated grain and chaff are deposited for separation of the grain from the chaff generally using an air flow through the sieve which acts differentially upon the grain and the chaff.

The combine often includes a control arrangement mounted within the cab for varying the speed of the fan motor so as to increase and decrease the air flow through the sieve. It will be appreciated that the air flow conditions are particularly important in ensuring proper separation of the grain and the chaff and those conditions will vary significantly depending upon various parameters. In some cases those parameters are relatively coarse for example the type of crop to be harvested. In other cases the parameters are very fine and significant variations can be noted from such matters as the ripeness of the crop which can vary across a field to be harvested and the humidity of the climatic conditions which can of course vary during the day.

The speed of the fan is a relatively coarse adjustment which must be made to provide the necessary coarse adjustments mentioned above. In addition the condition of the sieve can also be adjusted, that is the angle of the openings through the sieve, since the air flow conditions are dependent not only upon the amount of air flow and its velocity but also the angle and size of the openings in the sieve.

Most combines provide a lever mechanism which mechanically operates the openings or louvers in the sieve so that the openings can be adjusted. The mechanical lever arrangement is however positioned at the sieve and generally can only be actuated by an operative climbing from the cab, halting operation of the combine, moving to the rear of the combine and actuating the levers to a position which can be measured by experienced eye or in some cases by a measuring gauge.

There is a great reluctance therefore for the operative or user to carry out such adjustments particularly during the operating time and hence the fine adjustment which is possible by the adjustment of the sieve is generally not made. The operative therefore sets the sieve initially at a compromise position which achieves an acceptable level of grain separation while avoiding an unacceptable amount of grain loss over the rear end of the sieve.

SUMMARY OF THE INVENTION

It is one object of the present invention therefore to provide a combine harvester which has an improved adjustment operation enabling the operator to more finely tune the operation of the device to optimize combine performance.

It is a further object of the invention to provide a kit of parts which can be attached to a combine to improve the adjustability of the combine to enable optimization of operating characteristics.

According to a first aspect of the invention therefore there is provided a combine harvester comprising a cab for housing an operator, a header for picking up a crop to be harvested, straw separating means for extracting grain and chaff from straw of the crop, sieve means for receiving the grain and chaff and for extracting the grain from the chaff, fan means for generating an air flow through the sieve means, the sieve means including means defining a plurality of openings therethrough through which the grain can fall and through which air can pass and means for adjusting the openings to vary the grain and air flow conditions, and actuating means mounted in the cab for actuating said adjustment means for on the go variation of, said conditions.

According to a second aspect of the invention there is provided a kit of parts for attachment to a combine harvester of the type including a header for picking up a crop to be harvested, a straw separation means for extracting grain and chaff from straw of the crop, sieve means for receiving the grain and chaff and for extracting the grain from the chaff, fan means for generating an air flow through the sieve, the sieve including means defining a plurality of openings therethrough through which the grain can fall and through which the air can pass and means for adjusting the openings to vary the grain and air flow conditions, the kit of parts comprising a rod, manually operable means mounted at one end of the rod for rotating the rod about an longitudinal axis thereof, collar means for mounting the rod at a location remote from the sieve and so as to provide rotation thereof relative to the collar means with the manually operable means accessible by the operator, bracket means arranged for attachment to the sieve of the combine, a screw member carried in said bracket means for rotation relative thereto, means movable in response to rotation of said screw member to operate said adjusting means, elongate flexible coupling means having a first end for connection to said rod and the second opposed end for connection to said screw member such that rotation of said rod causes said flexible coupling means to drive said screw member, and guide means for confining said flexible coupling means to follow a path from said rod to said screw member through a wall of said combine.

The device therefore provides within the cab a manually actuable hand wheel device which can be rotated to achieve a measurable adjustment in the sieve operation. The experienced operator can therefore by operating the hand wheel according to observed or known conditions set the sieve adjustment to an accurately controlled position to optimize the operation of the combine as those conditions vary.

With the foregoing in view, and other advantages as will become apparent to those skilled in the art to which this invention relates as the specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
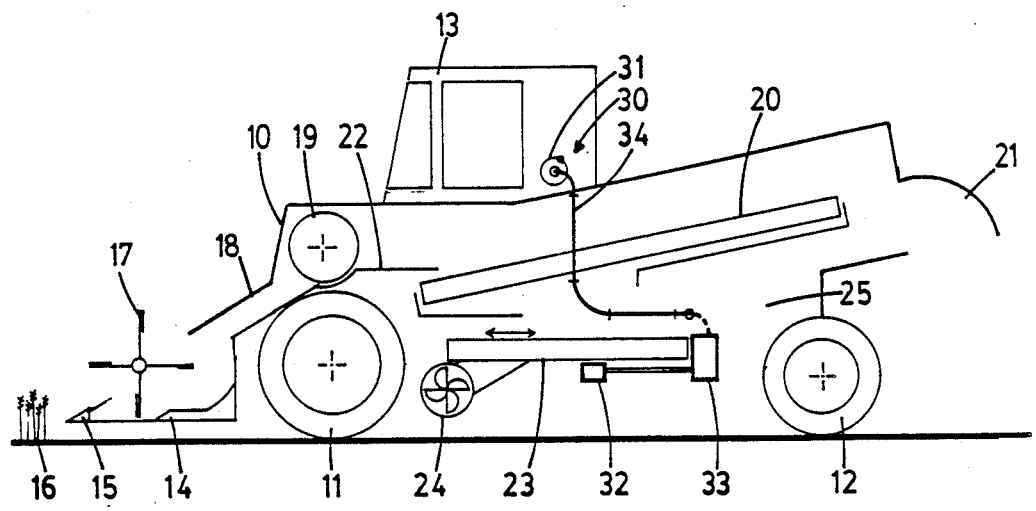
FIG. 1 is a schematic side elevational view of a combine harvester.

The combine shown in FIG. 1 is substantially conventional and the following description is included for completeness. The combine comprises a main frame 10 mounted upon ground wheels 11 and 12 by which the vehicle can be moved across the ground in a working direction. A cab 13 houses the operator within which is provided a steering mechanism (not shown) and various other controls for regulating the speed of the vehicle, the height of the header and various other detailed controls. The header is indicated at 14 and includes either a conventional pick up arrangement for crop lying in a swath or as indicated at 15 a cutting blade for cutting a standing crop indicated at 16. The header includes a reel 17 and a feeder housing 18 for directing the cut crop into the main frame.

Within the main frame and shown in phantom is provided a cylinder 19 which commences the separation of grain and chaff from the straw and straw walkers 20 which continue the separation so that separated straw can be ejected by a spreader mechanism indicated at 21. The separated grain and chaff is fed onto a pan 22 from which it moves rearwardly onto a sieve arrangement 23. The sieve arrangement is mounted for reciprocating movement in a forward to rearward direction which acts to move the grain and chaff rearwardly on the sieve while air flow from the fan 24 is blown through the sieve from the underside so as to cause separation by the differential reaction of the material to the air flow with the grain falling through the sieve into a further separating sieve and from there into a grain collection mechanism (not shown). The separated chaff indicated 25 falls from the rear end of the sieve together with any unseparated grain which of course should be kept to a minimum by controlling the parameters or operating conditions of the combine.

An adjustment device for the sieve of the combine is shown schematically at 30 and comprises a hand wheel 31 mounted within the cab, a sieve adjustment device schematically indicated at 32, an actuating mechanism indicated at 33 and a drive coupling indicated at 34.

Figure 2:
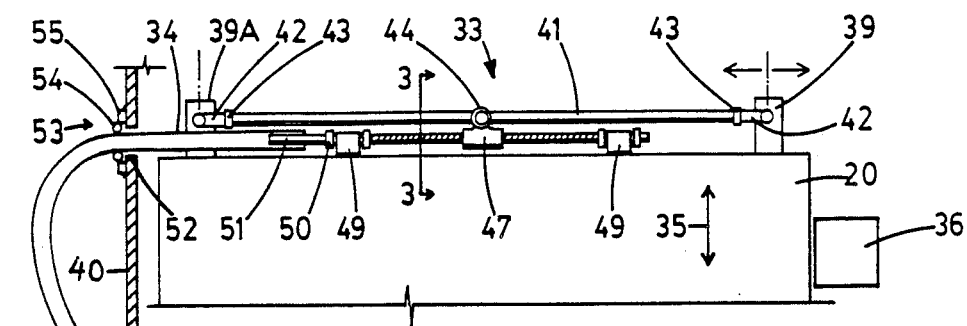
FIG. 2 is a schematic plan view of the combine harvester of FIG. 1 showing only part of the sieve, an adjacent side wall of the combine and the connections between the sieve adjustment mechanism and the hand crank within the cab.
Figure 3:
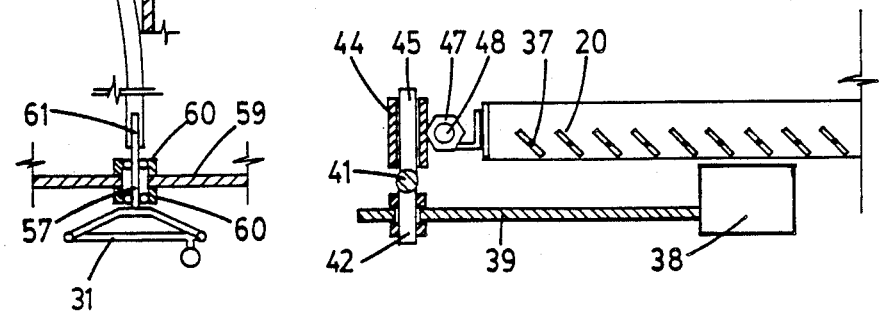
FIG. 3 is cross sectional view along the lines 3—3 of FIG. 2.
Figure 4:
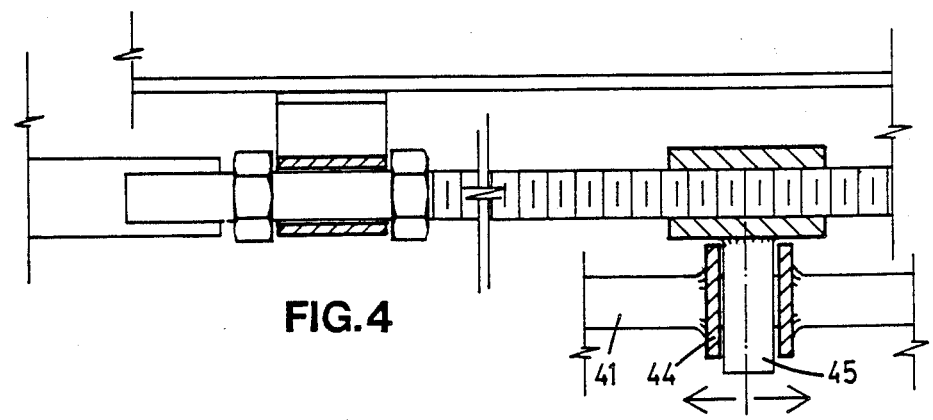
FIG. 4 a top plan view similar to FIG. 2 of a portion of the adjustment device on an enlarged scale.

Turning now to FIGS. 2, 3 and 4, the adjustment mechanism is shown in more detail. Thus there is provided the sieve 20 which is moved in a reciprocating action as indicated by the arrow 35 by a drive device indicated schematically at 36. The sieve includes a number of louvers 37 which are connected onto a common linkage schematically indicated at 38 which allows the angle of the louvers to be adjusted by way of a lever 39. The details of the louvers and the adjustment mechanism is conventional and hence will be well known to one skilled in the art or can be obtained by inspection of a conventional combine harvester.

In the arrangement shown in FIGS. 2 and 3 the sieve is divided into two halves with each half being separately adjustable by way of a lever one of which is indicated at 39 and the other indicated at 39A.

The sieve is mounted as shown in FIG. 1 in a lower part of the combine between the two side walls of the combine one of which is indicated at 40 with the side walls being stationary relative to which the sieve reciprocates in the forward to rearward direction as shown.

The conventional actuation of the adjustment mechanism of the sieve is by way of manual movement of the levers 39 and 39A in a direction transverse to the sieve with the levers remaining in a plane parallel to the sieve.

The kit of parts for obtaining on the go adjustment of the sieve comprises an elongate rod 41 which has a coupling mechanism 42 at each end for grasping and engaging the respective lever 39, 39A. The coupling member 42 is attached to the rod 41 by way of an adjustment nut 43 which allows the rod to be moved to a position so that its movement transverse to the sieve commonly actuates the levers 39, 39A and maintains the adjustment of the two halves of the sieve at a common position. The rod has attached thereto a vertical pin member 45. A sleeve 44 is mounted outside the pin member so that it can drive the pin member back and forth in the transverse direction to obtain the adjustment of the levers. The sleeve 44 is carried on a nut 47. The nut 47 is mounted upon a transverse screw member 48 so that rotation of the screw member causes the required transverse movement of the nut thus carrying with it the pin 45 and the rod 41 to obtain the necessary adjustment. The screw member 48 is mounted in brackets 49 which include a sleeve surrounding the screw member and collars 50 which hold the screw member against longitudinal movement so that the screw member is free to rotate within the brackets 49 but is held against movement along its axis that is transverse to the sieve.

One end of the screw member extends outwardly beyond one of the brackets 49 to provide a coupling end 51. The coupling end 51 is attached to the flexible coupling member or pipe 34 which extends from the coupling portion 51 to an opening 52 in the wall 40 of the combine. On an exterior surface of the wall 40 is provided a guide ring 53 which provides a smooth inner ring surface 54 which is attached by a suitable flange 55 to the outer surface of the wall of the combine. The flexible pipe 34 is therefore confined to a stationary position at the opening 52 passing through the opening which is slightly greater in diameter than the outside diameter of the pipe. In this way the reciprocation of the sieve is accommodated by flexing movement of the portion of the pipe between the opening and the coupling piece 51 of the screw member.

On the outer surface of the combine, the flexible pipe 34 curves through a right angle so that it extends generally along the outer wall 40 where it is confined by ring member 56 which in this case stands up at right angles to the outer surface so as to hold the flexible pipe in its direction along the outer surface 40.

The hand wheel 31 is mounted on a rod 57 which passes through an opening 58 in a wall 59 of the cab. The rod is carried on bearings 60 mounted on the wall so that the rod can be rotated by the hand crank about its longitudinal axis by a driver sitting within the cab without rotational movement being transmitted to a projecting portion 61 of the rod on the exterior of the cab. The projecting portion 61 is connected by insertion into the flexible pipe 34 so that the pipe surrounds the end of the rod and is rotatably driven by the rod as it is rotated by the hand crank 31.

The operator of the combine can therefore directly adjust the openings within the sieve of the combine from a position within the cab with a device which is graduated according to adjustment position. More particularly the operator knows that a number of turns of the hand crank in a particular direction will move the adjustment of the sieve to a particular requirement. Thus the sieve opening can be adjusted initially by a coarse adjustment by a multiple number of turns of the hand crank to accommodate for example a certain crop following which fine adjustments can be made during harvesting of the crop to accommodate changes during the harvesting for example of field conditions or atmospheric conditions to obtain the optimization of the grain separation.

In alternative arrangements of sieve, only a single adjustment lever is provided, in which case the pin 45 can be arranged to act directly on the single lever.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed:

1. A combine harvester comprising a cab for housing an operator, a header for picking up a crop to be harvested, straw separating means for extracting grain and chaff from straw of the crop, sieve means for receiving the grain and chaff and for extracting the grain from the chaff, fan means for generating an air flow through the sieve means, the sieve means including means defining a plurality of openings therethrough through which the grain can fall and through which air can pass and means for adjusting the openings to vary the grain and air flow conditions, and actuating means mounted in the cab for actuating said adjustment means for on the go variation of said conditions, said actuating means comprising a rod, manually operable means mounted at one end of the rod for rotating the rod about an longitudinal axis thereof, collar means for mounting the rod so as to project through the cab wall and so as to provide rotation thereof relative to the wall with the manually operable means inside the cab and an opposed end of the rod externally of said cab, bracket means arranged for attachment to the sieve means of the combine, a screw member carried in said bracket means for rotation thereto, means movable in response to rotation of said screw member to operate said adjusting means, elongate flexible coupling means having a first end connected to said rod and a second opposed end connected to said screw member such that rotation of said rod causes said flexible coupling means to drive said screw member, and guide means for confining said flexible coupling means to follow a path from said cab to said screw member through a wall of said combine.

2. The invention according to claim 1 wherein said sieve is mounted for reciprocating movement in a direction longitudinal of the combine and wherein said flexible coupling means is arranged to accommodate said reciprocating movement such that one end of the flexible coupling means is connected to said screw member for movement with the sieve and such that a further portion of the flexible coupling means engages an opening in said wall of the combine with said further portion maintained stationary at said combine wall.

3. The invention according to claim 1 including a guide ring, said guide ring having means for mounting thereof on said wall of said combine and being arranged to guide the flexible means through said wall and so as to confine said flexible means to a stationary position at said wall.

4. The invention according to claim 1 wherein the flexible means comprises a pipe having one end pressed onto an outer surface of said rod to surround the rod and a couple thereto for rotational movement therewith and an opposed end pressed onto an outer surface of said screw member to surround the screw member and to drive the screw member in rotational movement thereof.

5. The invention according to claim 1 wherein said manually operable means comprises a hand wheel on an end of said rod, said hand wheel being rotatable about an axis of the rod.

6. The invention according to claim 1 wherein said bracket means holds said screw member against movement longitudinal of the screw member and wherein there is provided a nut member on said screw member such that rotation of said nut member in a longitudinal direction of the screw member and means for communicating said longitudinal movement of said nut member to said adjustment means.

7. The invention according to claim 1 wherein said bracket means holds said screw member against movement longitudinal of the screw member and wherein there is provided a nut member on said screw member such that rotation of said nut member in a longitudinal direction of the screw member and means for communicating said longitudinal movement of said nut member to said adjustment means and wherein the adjustment means includes two separate levers each of which projects rearwardly from the sieve and wherein said means for communicating drive from said nut includes a rod extending transversely to the sieve at a position adjacent the rear edge of the sieve, said rod having means for attachment to each of said levers for common adjustment of the levers by movement of said nut along said screw member.

8. A kit of parts for attachment to a combine harvester of the type including a header for picking up a crop to be harvested, a straw separation means for extracting grain and chaff from straw of the crop, sieve means for receiving the grain and chaff and for extracting the grain from the chaff, fan means for generating an air flow through the sieve, the sieve including means defining a plurality of openings therethrough through which the grain can fall and through which the air can pass and means for adjusting the openings to vary the grain and air flow conditions, the kit of parts comprising a rod, manually operable means mounted at one end of the rod for rotating the rod about an longitudinal axis thereof, collar means for mounting the rod at a location remote from the sieve and so as to provide rotation thereof relative to the collar means with the manually operable means accessible to the operator, bracket means arranged for attachment to the sieve of the combine, a screw member carried in said bracket means for rotation relative thereto, means movable in response to rotation of said screw member to operate said adjusting means, elongate flexible coupling means having a first end for connection to said rod and the second opposed end for connection to said screw member such that rotation of said rod causes said flexible coupling means to drive said screw member, and guide means for confining said flexible coupling means to follow a path from said rod to said screw member through a wall of said combine.

9. The invention according to claim 8 wherein said sieve is mounted for reciprocating movement in a direction longitudinal of the combine and wherein said flexible coupling means is arranged to accommodate said reciprocating movement such that one end of the flexible coupling means is connected to said screw member for movement with the sieve and such that a further portion of the flexible coupling means engages an opening in said wall of the combine with said further portion maintained stationary at said combine wall.

10. The invention according to claim 9 including a guide ring, said guide ring having means for mounting thereof on said wall of said combine and being arranged to guide the flexible means through said wall and so as to confine said flexible means to a stationary position at said wall.

11. The invention according to claim 8 wherein the flexible means comprises a pipe having one end pressed onto an outer surface of said rod to surround the rod and a couple thereto for rotational movement therewith and an opposed end pressed onto an outer surface of said screw member to surround the screw member and to drive the screw member in rotational movement thereof.

12. The invention according to claim 8 wherein said manually operable means comprises a hand wheel on an end of said rod, said hand wheel being rotatable about an axis of the rod.

13. The invention according to claim 8 wherein said bracket means holds said screw member against movement longitudinal of the screw member and wherein there is provided a nut member on said screw member such that rotation of said nut member in a longitudinal direction of the screw member and means for communicating said longitudinal movement of said nut member to said adjustment means.

14. The invention according to claim 8 wherein said bracket means holds said screw member against movement longitudinal of the screw member and wherein there is provided a nut member on said screw member such that rotation of said nut member in a longitudinal direction of the screw member and means for communicating said longitudinal movement of said nut member to said adjustment means and wherein the adjustment means includes two separate levers each of which projects rearwardly from the sieve and wherein said means for communicating drive from said nut includes a rod extending transversely to the sieve at a position adjacent the rear edge of the sieve, said rod having means for attachment to each of said levers for common adjustment of the levers by movement of said nut along said screw member.

* * * * *